(12) United States Patent
Kim

(10) Patent No.: US 11,335,926 B2
(45) Date of Patent: May 17, 2022

(54) HUMIDIFIER FOR FUEL CELL

(71) Applicants: Hyundai Motor Company, Seoul (KR); Kia Motors Corporation, Seoul (KR)

(72) Inventor: Jong Sung Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 326 days.

(21) Appl. No.: 16/570,651

(22) Filed: Sep. 13, 2019

(65) Prior Publication Data

US 2020/0266464 A1    Aug. 20, 2020

(30) Foreign Application Priority Data

Feb. 20, 2019    (KR) ........................ 10-2019-0019604

(51) Int. Cl.
*H01M 8/04* (2016.01)
*H01M 8/04119* (2016.01)
*H01M 8/04828* (2016.01)

(52) U.S. Cl.
CPC ... *H01M 8/04149* (2013.01); *H01M 8/04843* (2013.01)

(58) Field of Classification Search
CPC .............. H01M 8/04149; H01M 8/04843
See application file for complete search history.

(56) References Cited

U.S. PATENT DOCUMENTS

| | | | | |
|---|---|---|---|---|
| 10,862,145 | B2* | 12/2020 | Oh ................... | H01M 8/04149 |
| 10,950,878 | B2* | 3/2021 | Oh ................... | H01M 8/04835 |
| 2002/0039674 | A1* | 4/2002 | Suzuki ............... | H01M 8/04119 |
| | | | | 429/414 |
| 2008/0093752 | A1* | 4/2008 | Jeon ....................... | B01D 63/02 |
| | | | | 261/100 |
| 2015/0364779 | A1* | 12/2015 | Noh .................. | H01M 8/04149 |
| | | | | 429/413 |
| 2016/0036073 | A1* | 2/2016 | Kim .................. | H01M 8/04291 |
| | | | | 429/414 |
| 2018/0062187 | A1* | 3/2018 | Kim .................. | H01M 8/04164 |

* cited by examiner

*Primary Examiner* — Amanda C. Walke
(74) *Attorney, Agent, or Firm* — Mintz Levin Cohn Ferris Glovsky and Popeo, P.C.; Peter F. Corless

(57) ABSTRACT

A fuel cell humidifier includes a membrane module accommodating a humidifying membrane, a first cap coupled to a first side of the membrane module and supplying a supply air to the humidifying membrane, and a second cap coupled to a second side of the membrane module and discharging a humidified supply air from the humidifying membrane to a cathode of a fuel cell stack. An exhaust gas inlet is coupled to the membrane module and provides an exhaust gas discharged from the stack and an exhaust gas outlet is coupled to the membrane module and discharges a dehumidified exhaust gas, which passes through the membrane module, to an exhaust system. A valve provides selective communication between a first region, where the supply air flows, including the first and second caps and a second region, where the exhaust gas flows, including the exhaust gas inlet and the exhaust gas outlet.

13 Claims, 6 Drawing Sheets

HUMIDIFIER FOR FUEL CELL

CROSS-REFERENCE TO RELATED APPLICATION

This application is claims the benefit of priority to Korean Patent Application No. 10-2019-0019604, filed on Feb. 20, 2019, the entire contents of which are incorporated herein by reference.

TECHNICAL FIELD

The present disclosure relates to a humidifier for a fuel cell, and more particularly, to a humidifier for a fuel cell which effectively reduces a hydrogen concentration of an exhaust gas discharged from the humidifier even when the fuel cell stack is in a low output state.

BACKGROUND

Research and development of a fuel cell system, which generates electrical energy using chemical reaction of fuel supplied continuously, has been conducted as an alternative to solve the global environment problem. The fuel cell system may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), and the like based on the type of electrolyte used, and may be applied to various application fields such as mobile power, transportation, and distributed power generation depending on types of fuel used, operating temperature, output range, and the like.

Among the above-described fuel cells, the polymer electrolyte membrane fuel cell has been applied to a hydrogen powered vehicle (a hydrogen fuel cell vehicle) which has been developed to replace an internal combustion engine. The hydrogen fuel cell vehicle is configured to produce its own electricity through a chemical reaction between hydrogen and oxygen, and to move by driving a motor thereof. Therefore, the configuration of the hydrogen fuel cell vehicle includes a hydrogen tank (H2 tank) in which hydrogen (H2) is stored, a fuel cell stack (FC STACK) in which electricity is produced through redox reaction of hydrogen and oxygen (O2), a battery configured to store electricity produced in the fuel cell stack, a controller configured to convert and adjust the produced electricity, and a motor configured to generate a driving force as well as various devices for draining generated water.

The fuel cell stack is a device referred to as a main body of the fuel cell in which tens or hundreds of cells are stacked in series and has a structure in which a plurality of cells are stacked between end plates. The inside of each cell is partitioned by an electrolyte membrane. An anode is disposed at a first side of the fuel cell stack and a cathode is disposed at a second side of the fuel cell stack. A separation plate is disposed between the cells to adjust a flow path of hydrogen and oxygen, and is formed of a conductor for transferring electrons upon the redox reaction.

In the fuel cell stack, hydrogen is separated into a hydrogen ion and an electron by a catalyst when hydrogen is supplied to the anode of the fuel cell stack. The electron moves to the outside of the fuel cell stack through the separation plate to produce electricity. After the hydrogen ion passes through the electrolyte membrane and moves to the cathode, the hydrogen ion combines with oxygen supplied from the outside air and an electron to produce water, and produced water is discharged to the outside.

A hydrogen supply device of the fuel cell system has a circulating structure in which hydrogen supplied to the fuel cell stack is discharged from the fuel cell stack and supplied again to the fuel cell stack. As a result, as time of power generation of the fuel cell system elapses, a hydrogen concentration in the fuel cell system continuously decreases. To prevent a decrease in the hydrogen concentration, a hydrogen valve is opened to discharge hydrogen having the low concentration based on a specific period of time.

Generally, hydrogen discharged by opening the hydrogen valve flows into a shell side of a humidifier, is mixed with an exhaust air discharged from the fuel cell stack, and is discharged to the outside through an exhaust system. To ensure safety of the fuel cell vehicle, the hydrogen concentration discharged to the outside through the exhaust system is regulated to be less than a specific value (4%). Various operating control conditions and a hydrogen concentration reduction device are applied to the fuel cell system or the vehicle to cope with the regulation. However, reducing the hydrogen concentration is limited at a low output of the fuel cell stack having a high hydrogen concentration.

SUMMARY

The present disclosure provides a humidifier for a fuel cell which effectively reduces a hydrogen concentration of an exhaust gas discharged from the humidifier even when the fuel cell stack is in a low output state. In addition, an aspect of the present disclosure provides a humidifier for a fuel cell which is capable of performing an operation for reducing a hydrogen concentration under a specific condition without a separate driving power.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a humidifier for a fuel cell may include a membrane module accommodating a humidifying membrane, a first cap coupled to a first side of the membrane module and configured to supply a supply air to the humidifying membrane, a second cap coupled to a second side of the membrane module opposite to the first side of the membrane module and configured to discharge a humidified supply air introduced from the humidifying membrane to a cathode of a fuel cell stack, an exhaust gas inlet coupled to the membrane module and configured to provide an exhaust gas discharged from the fuel cell stack, an exhaust gas outlet coupled to the membrane module and configured to discharge a dehumidified exhaust gas, which passes through the membrane module, through an exhaust system, and a valve configured to provide selectively communication between a first region, where the supply air flows, including the first cap and the second cap and a second region, where the exhaust gas flows, including the exhaust gas inlet and the exhaust gas outlet.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
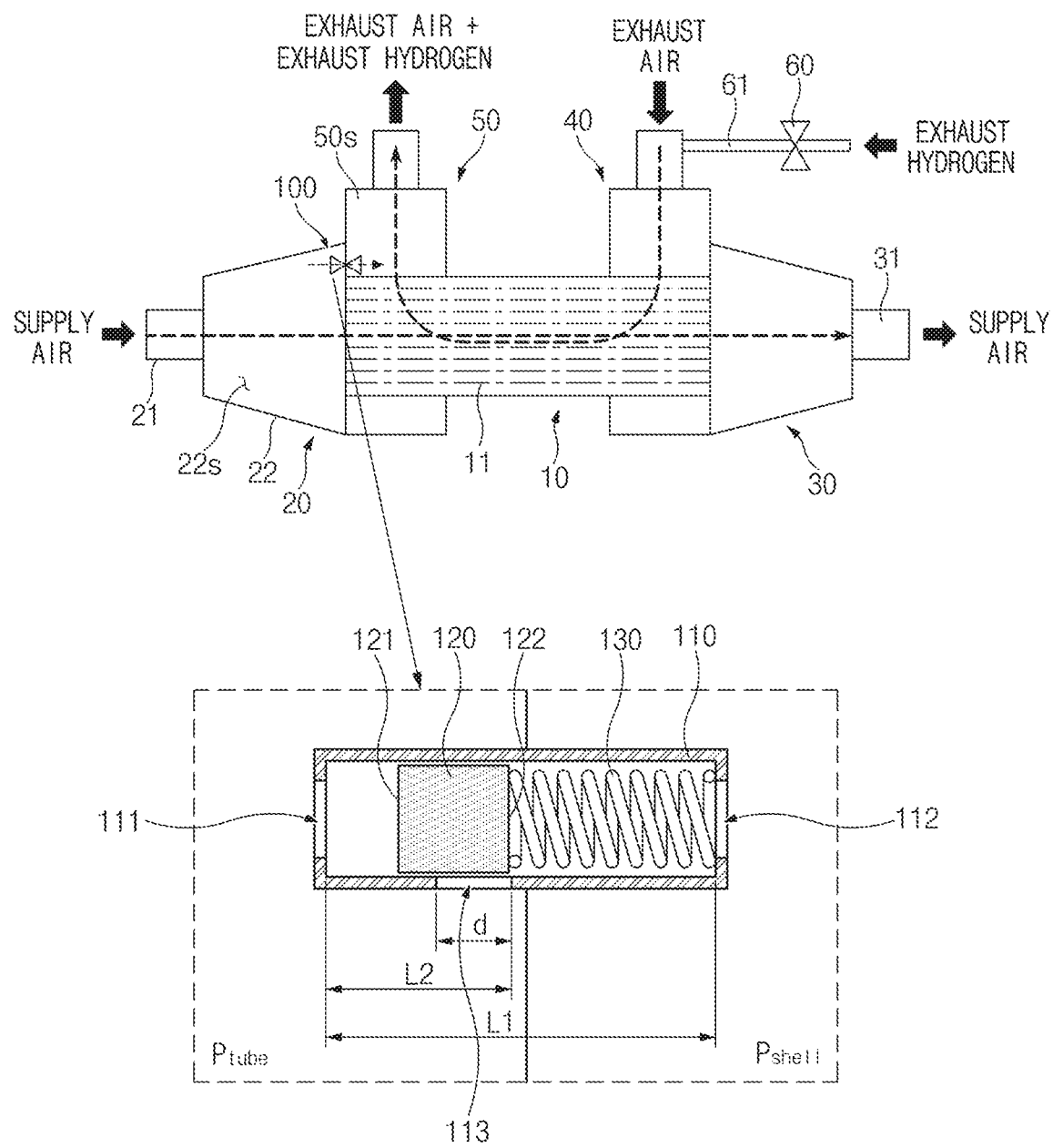
FIG. 1 is a schematic view illustrating a humidifier for a fuel cell according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. Additionally, it should be also understood that the expression that some constituent element is "connected", "coupled" or "joined" to another constituent element means that some constituent element may be directly connected or joined to another constituent element or is also "connected", "coupled" or "joined" to another constituent element through a further component therebetween.

FIG. 1 is a schematic view illustrating a humidifier for a fuel cell according to an exemplary embodiment of the present disclosure. The humidifier for the fuel cell according to an exemplary embodiment of the present disclosure may be applied to a fuel cell system which generates electrical energy by an electrochemical reaction between fuel as hydrogen and air as an oxidant. For example, as being employed in a fuel cell vehicle, the fuel cell system may operate an electric motor and drive the vehicle.

The humidifier for the fuel cell according to an exemplary embodiment of the present disclosure may perform membrane humidification of an exhaust gas discharged from a fuel cell stack and a supply air supplied from an air compressor and may provide the humidified supply air to the fuel cell stack. The exhaust gas may include at least one of an exhaust gas and exhaust hydrogen, which are discharged from the fuel cell stack.

Referring to FIG. 1, the humidifier for the fuel cell may include a membrane module 10, a first cap 20, a second cap 30, an exhaust gas inlet 40, and an exhaust gas outlet 50. The membrane module 10 is also referred to as a "shell-in" in the related art. The membrane module 10 may have a structure in which humidifying membranes 11, a plurality of hollow fiber membranes, are densely packed, for example, a structure in which the humidifying membranes 11 are embedded in a housing having a cylinder shape.

The membrane module 10 may include a supporter (also referred to as a "potting device" in the related art) that supports both ends of the humidifying membranes 11. For example, the supporter may be made of a polymer material and may be fixed to both ends of the housing to support the both ends of the humidifying membranes 11. The first cap 20 is also referred to as "a cap-in" in the related art and is provided for injecting the supply air supplied through an air compressor into the membrane module 10. The first cap 20 may be coupled to a first end of the membrane module 10. A supply air inlet 21 that supplies the supply air to the membrane module 10 may be formed at the first cap 20. The second cap 30 is also referred to as "a cap-out" in the related art, and is provided for discharging a humidified air introduced from the membrane module 10 to the fuel cell stack. The second cap 30 may be coupled to a second end of the membrane module 10. A humidified air outlet 31 for discharging the humidified air to the fuel cell stack may be formed at the second cap 30.

The exhaust gas inlet 40 may be coupled to the first side of the membrane module 10 to inject an exhaust gas discharged from the fuel cell stack into the housing. The exhaust gas outlet 50 may be coupled to the second side of the membrane module 10 to discharge a dehumidified exhaust gas to an exhaust system. Referring to FIG. 1, both the exhaust gas inlet 40 and the exhaust gas outlet 50 may include openings disposed at an upper side of the membrane module 10 in the present embodiment. However, the present exemplary embodiment is not limited thereto. The exhaust gas inlet 40 may include an opening disposed at the upper side of the membrane module 10 and the exhaust gas outlet 50 may include an opening disposed at a lower side of the membrane module 10.

In the humidifier, a region, where the supply air to be supplied to the fuel cell stack flows, is referred to as "a tube side", and a region, where the exhaust air discharged from the fuel cell stack flows, is referred to as "a shell side" in the related art. In the present exemplary embodiment, the tube side may be defined as including the first cap 20, the second cap 30, and the humidifying membranes 11. In addition, the shell side may be defined as including a region where the exhaust gas flows inside the membrane module 10, the exhaust gas inlet 40, and the exhaust gas outlet 50.

A hydrogen supply device of the fuel cell system may have a circulating structure in which hydrogen supplied to the fuel cell stack is discharged from the fuel cell stack and supplied again to the fuel cell stack. As a result, as time of power generation of the fuel cell system elapses, a hydrogen concentration in the fuel cell system continuously decreases. To prevent a decrease in the hydrogen concentration, a hydrogen valve may be opened to discharge hydrogen having the low concentration based on a specific period of time. Generally, hydrogen discharged by opening the hydrogen valve may be introduced into the shell side of the humidifier, mixed with the exhaust air discharged from the fuel cell stack, and discharged to the outside through an exhaust system.

For ensuring safety of the fuel cell vehicle, the hydrogen concentration discharged to the outside through the exhaust system is regulated to be less than a specific value (e.g., about 4%). Various operating control conditions and a hydrogen concentration reduction device are applied to the fuel cell system or the vehicle to cope with the regulation. However, reducing the hydrogen concentration is limited at a low output of the fuel cell stack having a high hydrogen concentration. The humidifier for the fuel cell according to the present exemplary embodiment effectively reduces the hydrogen concentration in the exhaust gas discharged from the humidifier even when the fuel cell stack is at the low output.

More specifically, the humidifier for the fuel cell according to the present exemplary embodiment may include a valve 100 that provides selectively communication between a first region (or the tube side), where the supply air flows, including the first cap 20 and the second cap 30 and a second region (or the shell side), where the exhaust gas flows, including the exhaust gas inlet 40 and the exhaust gas outlet 50. The valve 100 may be opened and closed by a difference between an internal pressure of the first region (e.g., a pressure of the tube side; $P_{tube}$ of FIG. 1) and an internal pressure of the second region (e.g., a pressure of the shell side; $P_{shell}$ of FIG. 1). The supply air may be introduced into the second region from the first region to allow the hydrogen concentration of the mixed gas discharged through the exhaust gas outlet 50 to be reduced when the valve 100 is opened.

Features of the humidifier for the fuel cell according to the present exemplary embodiment will be described in more detail below. Referring to FIG. 1, the first cap 20 may include a first cap housing 22, the first cap housing 22 may provide an internal space 22s, the internal space 22s may communicate with the exhaust gas inlet 40, and the exhaust gas may be introduced into the internal space 22s of the first cap housing 22.

The first cap 20 may provide a supply air inflow path through which the supply air supplied to the humidifying membranes 11 flows. The supply air inlet 21 into which the supply air is introduced may be formed at a first side of the first cap housing 22. A supply air outlet 31 through which the supply air is discharged may be formed at the second cap 30. An inflow of the exhaust hydrogen, which is discharged from an anode of the fuel cell stack, toward the humidifier may be adjusted by a hydrogen valve 60. In general, the hydrogen valve 60 is referred to as a purge valve. The exhaust hydrogen discharged from the anode may flow through a hydrogen inlet 61 to be introduced into the exhaust gas inlet 40, when the hydrogen valve is opened.

Although not shown, in another exemplary embodiment, the exhaust hydrogen may be directly introduced into the exhaust gas outlet 50, rather than the exhaust gas inlet 40. The valve 100 may be provided to allow the tube side, where the supply air flows, including the first cap 20 and the second cap 30 to selectively communicate with the shell side, where the exhaust gas flows, including the exhaust gas inlet 40 and exhaust gas outlet 50.

In the present exemplary embodiment, the valve 100 may be installed between the first cap 20 and the exhaust gas outlet 50. Although not shown, in another exemplary embodiment, the valve 100 may be installed between the second cap 30 and the exhaust gas inlet 40, and the valve 100 may be installed anywhere in the humidifier if it is in a position suitable for selectively communicating the tube side and the shell side.

Furthermore, the valve 100 may include a cylinder 110 and a piston 120. The cylinder 110 may be formed to have a specific length and an internal space in which the piston 120 is movably installed may be provided inside the cylinder 110. The cylinder 110 may be formed with a first length (L1 in FIG. 1). In the cylinder 110, a first end of the cylinder 110 may be disposed at the first cap 20 and a second end of the cylinder 110 may be disposed at the exhaust gas outlet 50, with respect to a longitudinal direction of the cylinder 110. The cylinder 110 may include a first connection aperture 111 into which the supply air from the tube side may be introduced, a second connection aperture 112 into which the exhaust gas from the shell side may be introduced, and a valve opening/closing aperture 113.

The piston 120 may be movably installed inside the cylinder 110 to open and close the valve opening/closing aperture 113. The piston 120 may be installed in an internal space of the cylinder 110 while being movable to the first side and the second side of the cylinder 110 in the longitudinal direction of the cylinder 110 (e.g., the direction in which L1 of FIG. 1 extends). The supply air may be introduced into the internal space of the cylinder 110 from the internal space 22s of the first cap housing 22 through the first connection aperture 111. The exhaust gas may be introduced into the internal space of the cylinder 110 from an internal space 50s of the exhaust gas outlet 50 through the second connection aperture 112.

The first connection aperture 111 and the second connection aperture 112 may be respectively formed on the first side and the second side of the cylinder 110 with respect to the longitudinal direction of the cylinder 110 to be formed facing each other. The valve opening/closing aperture 113 may be formed in the cylinder 110 in a direction perpendicular to the longitudinal direction of the cylinder 110. In other words, the valve opening/closing aperture 113 may be formed at the first side of the cylinder 110. A force applied to a first side 121 of the piston 120 by the supply air and a force applied to a second side 122 of the piston 120 by the exhaust gas allow the piston 120 to move inside the cylinder 110 and allow the valve opening/closing aperture 113 to be opened or closed.

Referring to FIG. 1, the piston 120 may have a specific length greater than a length d of the valve opening/closing aperture 113 with respect to the longitudinal direction of the cylinder 110 (L1 direction in FIG. 1) to close the valve opening/closing aperture 113 when the piston 120 is disposed at a specific close position. The piston 120 may have a specific length less than a distance (or a second length; L2 of FIG. 1) between the first end of the cylinder 110 where the first connection aperture 111 is formed and the farthest part of the valve opening/closing aperture 113 from the first end of the cylinder 110 with respect to the longitudinal direction of the cylinder 110 (L1 direction in FIG. 1) to at least partially open the valve opening/closing aperture 113 when the piston 120 is disposed at a specific open position.

The valve 100 may further include an elastic member 130 disposed inside the cylinder 110 to elastically support the piston 120. The elastic member 130 may elastically support the piston 120 in a direction in which the piston 120 is pressed by the exhaust gas introduced into the cylinder 110. In other words, the elastic member 130 may be disposed at a portion of the cylinder 110 adjacent to the shell side to elastically support the other side 122 of the piston 120. Although not shown, the elastic member 130 may be disposed at a portion of the cylinder 110 adjacent to the tube side to elastically support one side 121 of the piston 120.

The elastic member 130 may be provided to have a specific modulus of elasticity for allowing the valve opening/closing aperture 113 to be closed by the piston 120 when the fuel cell stack is in a relatively low output state, the hydrogen valve 60 is closed, and the exhaust hydrogen is not introduced from the fuel cell stack into the shell side, and for allowing the valve opening/closing aperture 113 to be opened when the fuel cell stack is in the relatively low output state, the hydrogen valve 60 is open, and the exhaust hydrogen is introduced from the fuel cell stack into the shell side. Additionally, the elastic member 130 may be provided to have a specific modulus of elasticity for allowing the valve opening/closing aperture 113 to be closed by the piston 120 regardless of opening and closing of the hydrogen valve 60 when the fuel cell stack is in a relatively high output state.

A relatively substantial amount (or a high pressure) of supply air may be introduced into the fuel cell stack in the relatively high output state of the fuel cell stack. In particular, although the exhaust gas discharged from the fuel cell stack is mixed with the exhaust hydrogen discharged through the hydrogen valve 60, the hydrogen concentration in the mixed exhaust gas is relatively low. Meanwhile, a relatively minimal amount (or a low pressure) of supply air may be introduced into the fuel cell stack in the relatively low output state of the fuel cell stack. In particular, the hydrogen concentration of the mixed exhaust gas in the low output state is greater than that in the high output state when the exhaust gas discharged from the fuel cell stack is mixed with the exhaust hydrogen discharged through the hydrogen valve 60.

According to the present disclosure, the valve 100 may be opened, some supply air may be introduced into the shell side from the tube side, and the hydrogen concentration in the gas mixture of the supply air and the exhaust gas may be decreased when the hydrogen valve 60 is opened in the relatively low output of the fuel cell stack and the hydrogen concentration in the exhaust gas becomes high.

Figure 2A:
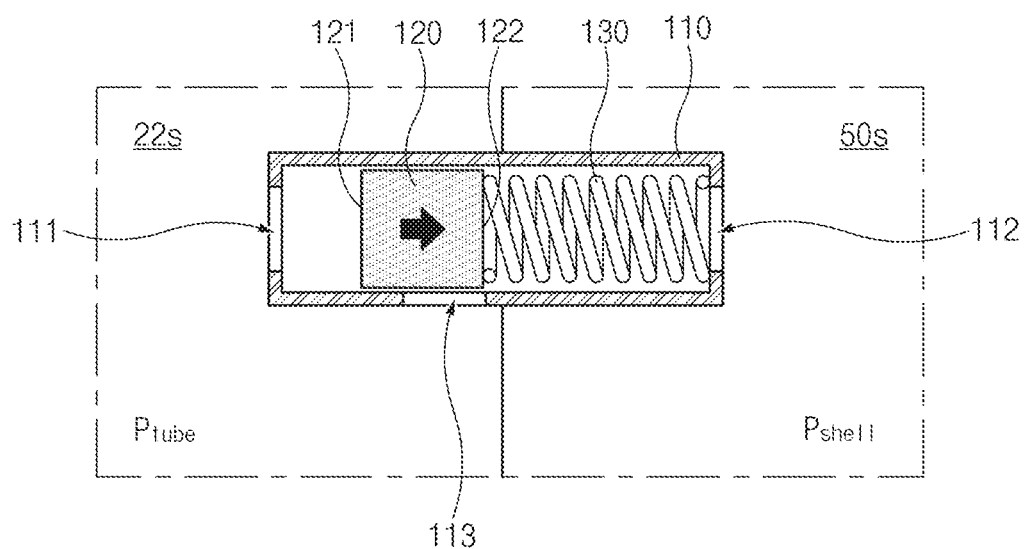
FIGS. 2A and 2B are views illustrating an operation of a valve of the humidifier for the fuel cell of FIG. 1 according to an exemplary embodiment of the present disclosure.
Figure 2B:
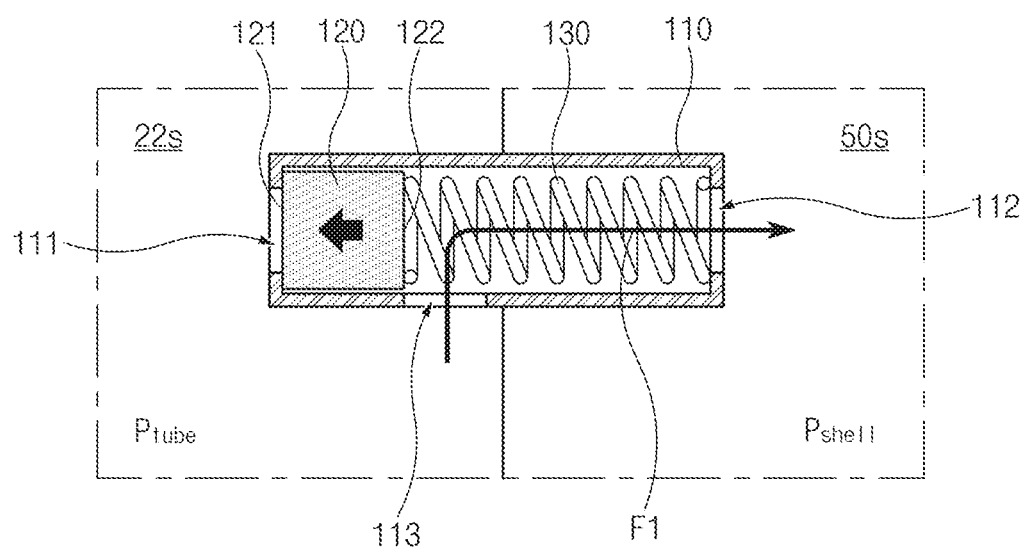

FIGS. 2A and 2B are views illustrating an operation of a valve of the humidifier for the fuel cell of FIG. 1. Hereinafter, referring to FIGS. 2A and 2B, the operation of the humidifier for the fuel cell according to an exemplary embodiment of the present disclosure.

FIG. 2A shows a case where the fuel cell stack is in a relatively high output state or a case where the fuel cell stack is in the relatively low output state and the hydrogen valve 60 is closed to prevent the exhaust hydrogen from being introduced into the humidifier from the fuel cell stack (e.g., including a case where the substantial amount of the exhaust hydrogen is not introduced through the hydrogen valve 60 although the exhaust hydrogen is partially introduced).

Particularly, the first side 121 of the piston 120 may be pressed by the tube side pressure (Ptube), and the second side 122 of the piston 120 may be pressed by the shell side pressure Pshell. In other words, the first side 121 of the piston 120 may be pressured by the supply air introduced through the first connection aperture 111 and the second side 122 of the piston 120 may be pressured by the exhaust gas (or an exhaust air) introduced through the second connection aperture 112. The force applied to one side 121 of the piston 120 by the supply air, the force applied to the other side 122 of the piston 120 by the exhaust gas, and an elastic force of the elastic member 130 allow the piston 120 to be disposed at the specific close position for closing the valve opening/closing aperture 113. In particular, the valve 100 may not be allowed to be closed.

FIG. 2B shows a case where the fuel cell stack is in the relatively low output state, the hydrogen valve 60 is opened, and therefore the exhaust hydrogen may be introduced into the humidifier from the fuel cell stack. Particularly, in the shell side, the exhaust air discharged from the fuel cell stack is mixed with the exhaust hydrogen and therefore the exhaust gas having an increased pressure flows. The exhaust gas may be introduced into the cylinder 110 through the second connection aperture 112 of the cylinder 110 to press the other side 122 of the piston 120. The force applied to the first side 121 of the piston 120 by the supply air, the force applied the second side 122 of the piston 120 by the exhaust gas, and the elastic force of the elastic member 130 allow piston 120 to be disposed at the specific open position for opening the valve opening/closing aperture 113.

In particular, the valve 100 may be opened to allow inflow of the supply air from the tube side (or the internal space 22s of the first cap housing) to the shell side (or the internal space 50s of the exhaust gas outlet). Additionally, flow F1 of air is performed as shown in FIG. 2B. In general, the tube side pressure Ptube is greater than the shell side pressure Pshell even when the hydrogen valve 60 is opened and the exhaust hydrogen is introduced into the shell side as illustrated in FIG. 2B. Therefore, the elastic member 130 may be provided to have the specific modulus of elasticity and to elastically support the piston 120 in a direction where the valve opening/closing aperture 113 is opened.

Figure 3:
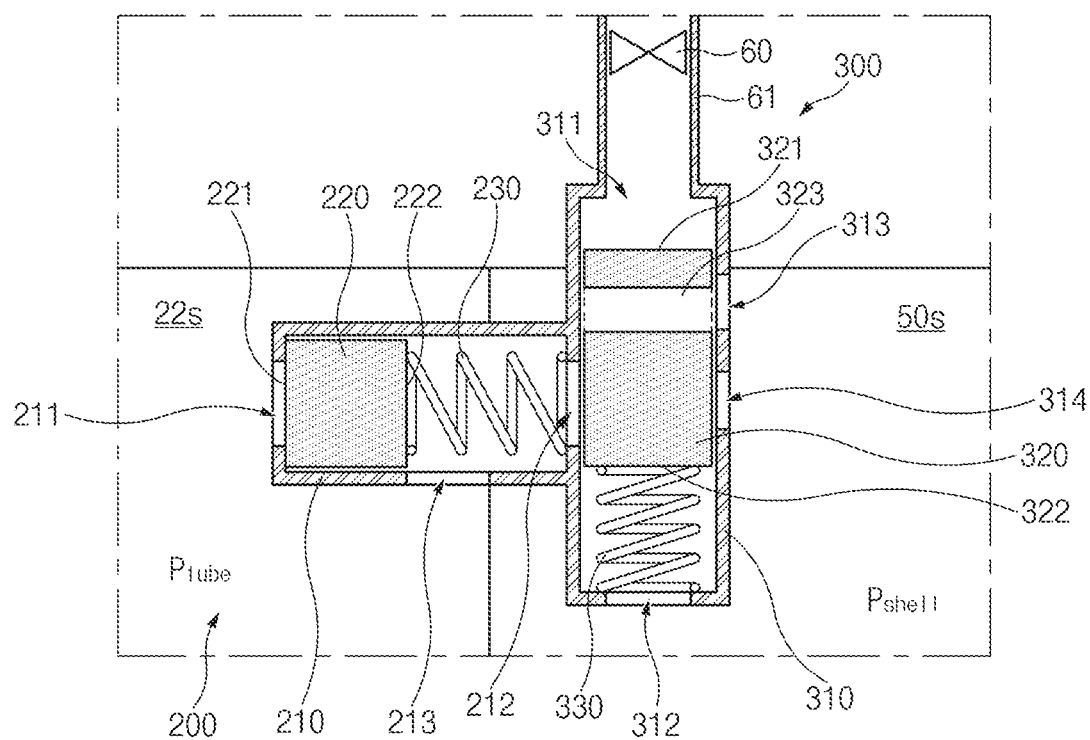
FIG. 3 is an enlarged view schematically illustrating a part of a humidifier for a fuel cell according to an exemplary embodiment of the present disclosure.

FIG. 3 is an enlarged view schematically showing a part of a humidifier for a fuel cell according to another exemplary embodiment of the present disclosure. Hereinafter, the humidifier for the fuel cell according to another exemplary embodiment of the present disclosure will be described with reference to FIG. 3 focusing on parts different from the one exemplary embodiment of the present disclosure illustrated in FIG. 1. A different part of another exemplary embodiment of the present disclosure from one exemplary embodiment of the present disclosure is a valve that allows inflow of a supply air from a tube side to a shell side in the humidifier. The remaining parts of the humidifier not described below may be understood to be the same as in one exemplary embodiment of the present disclosure described with reference to FIG. 1.

Referring to FIG. 3, the humidifier for the fuel cell according to another exemplary embodiment of the present disclosure may include a first valve 200 and a second valve 300. The first valve 200 is provided to selectively allow inflow of the supply air from the tube side to the shell side. The second valve 300 is provided to selectively allow inflow of the exhaust hydrogen from the fuel cell stack to the shell side of the humidifier. In addition, the second valve 300 may adjust the opening and closing of the first valve 200. The opening of the second valve 300 may be a necessary condition for opening the first valve 200. In other words, the first valve 200 and the second valve 300 may be provided so that the first valve 200 may not be opened when the second valve 300 is opened, but the first valve 200 should not be opened when the second valve 300 is closed.

The first valve 200 may include a first cylinder 210, a first piston 220, and a first elastic member 230. The first valve 200 is the same as the valve 100 described with reference to FIGS. 1, 2A, and 2B. A second connection aperture 212 of the first valve 200 may be connected to the second valve 300. The first valve 200 and the second valve 300 may communicate with each other via the second connection aperture 212. The second valve 300 may include a second cylinder 310, a second piston 320, and a second elastic member 330. The configuration and operation principle of the second valve 300 may be understood to be substantially the same as those of the first valve 200. The second valve 300 may be opened or closed based on the pressure of the exhaust hydrogen discharged from the fuel cell stack.

In particular, the second cylinder 310 may include a first aperture 311 into which the exhaust hydrogen may be introduced from the fuel cell stack, a second aperture 312 into which the exhaust gas may be introduced from the shell side, and a hydrogen exhaust aperture 313. The second piston 320 may be movably installed inside the second cylinder 310 to open and close the hydrogen exhaust aperture 313. A force applied to a first side 321 of the second piston 320 by the exhaust hydrogen, a force applied to a second side 322 of the second piston 320 by the exhaust gas, and an elastic force of the second elastic member 330 may allow the second piston 320 to move inside the second cylinder 310.

The second cylinder 310 may include a third aperture connected to the second connection aperture 212. In this exemplary embodiment, the first cylinder 210 and the second cylinder 310 may be formed integrally with each other, and the third aperture and the second connection aperture 212 unite into one. Although not shown, the second connection aperture 212 may be formed at the first cylinder 210 and the third aperture may be formed at the second cylinder 310 when the first cylinder 210 and the second cylinder 310 are separated from each other and connected by a separate connection pipe.

The exhaust gas may be introduced into an internal space of the first cylinder 210 from the shell side through the second valve 300 when the second piston 320 is disposed at a specific open position. Particularly, a force applied to a first side 221 of the first piston 220 by the supply air, a force applied to a second side 222 of the first piston 220 by the exhaust gas, and a force of the first elastic member 230 may allow the first piston 220 to move to a specific open position inside the first cylinder 210.

Meanwhile, the first cylinder 210 and the second cylinder 310 may be disposed so that a longitudinal direction of the first cylinder 210 and a longitudinal direction of the second cylinder 310 are perpendicular to each other. In other words, the first cylinder 210 and the second cylinder 310 may be disposed so that a moving direction of the first piston 220 and a moving direction of the second piston 320 are perpendicular to each other. A fourth aperture 314 may be formed at the second cylinder 310.

A piston aperture 323 may be formed at the second piston 320 to pass through the first side and the second side of the second piston 320. The piston aperture 323 may be formed to pass through the first side and the second side of the second piston 320 in a specific direction perpendicular to the moving direction of the second piston 320. The exhaust hydrogen introduced into the first aperture 311 may be discharged to the shell side (or an internal space 50s of the exhaust gas outlet) through the hydrogen exhaust aperture 313 and the exhaust gas introduced through the fourth aperture 314 may be introduced into an internal space of the first cylinder 210 through the piston aperture 323 and the second connection aperture 212 when the second piston 320 is disposed at the specific open position.

Thus, the exhaust gas may be introduced into the first cylinder 210 only when the second piston 320 is disposed at the specific open position. The second elastic member 330 may be installed inside the second cylinder 310 to elastically support the second piston 320 in a direction where the second piston 320 is pressed by the exhaust gas introduced into the second cylinder 310. In other words, the second elastic member 330 may elastically support the second piston 320 in a direction from the specific open position toward the specific close position.

Figure 4A:
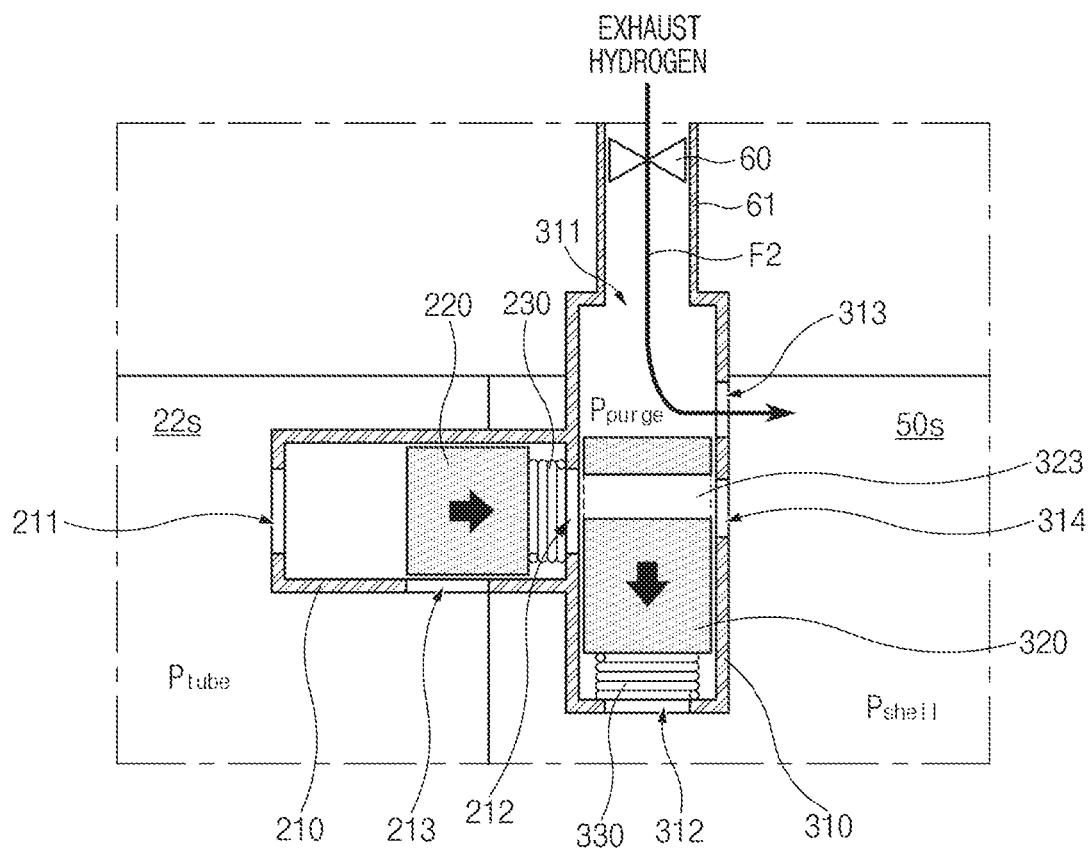
FIGS. 4A and 4B are views illustrating an operation of the first and second valves of the humidifier for the fuel cell of FIG. 3 according to an exemplary embodiment of the present disclosure.
Figure 4B:
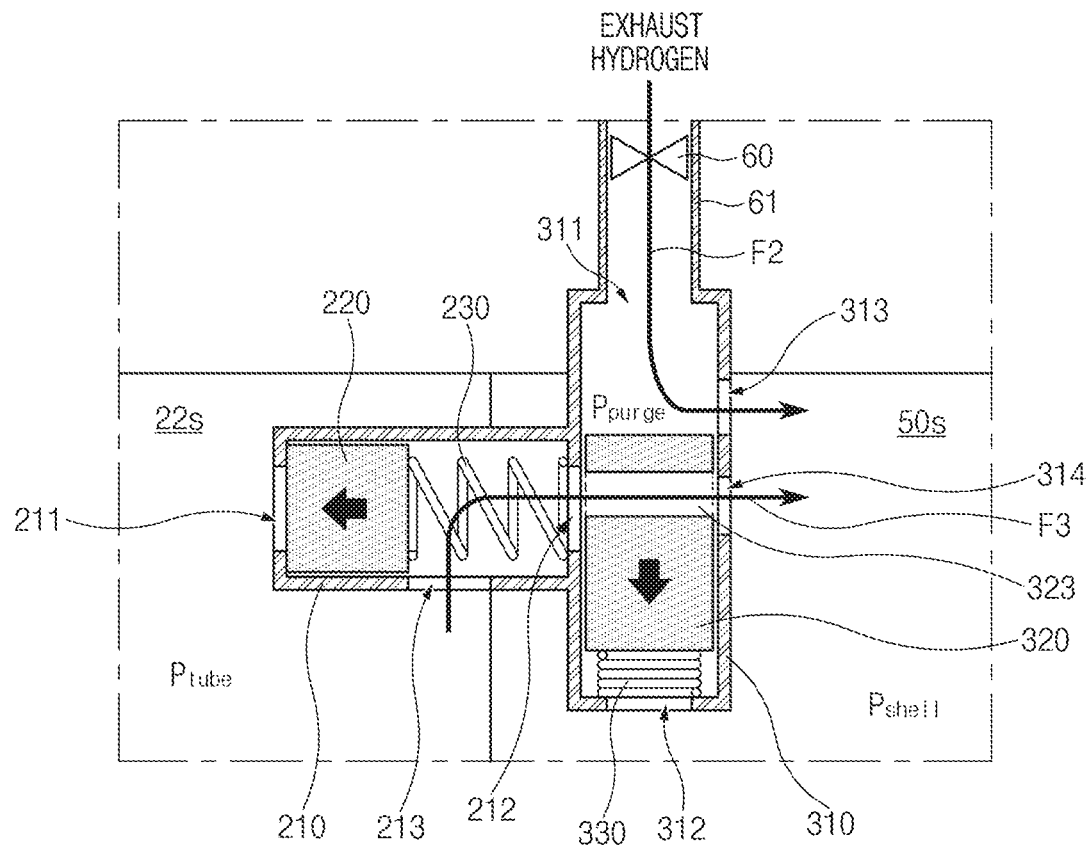

FIGS. 4A and 4B are views illustrating an operation of the first and second valves of the humidifier for the fuel cell of FIG. 3. Hereinafter, the operation of the humidifier for the fuel cell according to another exemplary embodiment of the present disclosure will be described with reference to FIGS. 4A and 4B. FIG. 4A shows a case where the fuel cell stack is in the relatively high output state, the hydrogen valve 60 is opened, and therefore the exhaust hydrogen may be introduced into the humidifier from the fuel cell stack.

The second piston 320 may move to the specific open position by the pressure $P_{purge}$ of the exhaust hydrogen and therefore the exhaust hydrogen discharged from the fuel cell stack may be introduced into the shell side (or the internal space 50s of the exhaust gas outlet) (see F2 in FIG. 4A). In addition, the exhaust gas introduced through the fourth through aperture 314 may be introduced into the internal space of the first cylinder 210 through the piston aperture 323 and the second connection aperture 212.

In particular, the first side 221 of the first piston 220 may be pressed by the tube side pressure $P_{tube}$, and the second side 222 of the first piston 220 may be pressed by the shell side pressure $P_{shell}$. In other words, the first side 221 of the first piston 220 may be pressed by the supply air introduced through a first connection aperture 211, and the second side 222 of the first piston 220 may be pressed by the exhaust gas (e.g., gas mixture of the exhaust air and the exhaust hydrogen) introduced through the second connection aperture 212. Since the high-pressure supply air may be introduced into the tube side when the fuel cell stack is in the relatively high output state, the first piston 220 may be disposed at the specific close position and the first valve may be is closed. In this case, inflow of the supply air from the tube side to the shell side is not allowed.

FIG. 4B shows a case where the fuel cell stack is in the relatively low output state, the hydrogen valve 60 is opened, and therefore the exhaust hydrogen may be introduced into the humidifier from the fuel cell stack. In particular, the second piston 320 may move to the specific open position by the exhaust hydrogen pressure Ppurge and therefore the exhaust hydrogen discharged from the fuel cell stack may be introduced into the shell side (or the internal space 50s of the exhaust gas outlet) (See F2 in FIG. 4B).

Additionally, the exhaust gas introduced through the fourth through aperture 314 may be introduced into the internal space of the first cylinder 210 through the piston aperture 323 and the second connection aperture 212. The first side 221 of the first piston 220 may be pressed by the tube side pressure Ptube and the second side 222 of the first piston 220 may be pressed by the shell side pressure Pshell. In other words, the first side 221 of the first piston 220 may be pressed by the supply air introduced through the first connection aperture 211 and the second side 222 of the first piston 220 may be pressed by the exhaust gas (the gas mixture of the exhaust air and the exhaust hydrogen) introduced through the second connection aperture 212.

Since the low-pressure supply air may be introduced into the tube side when the fuel cell stack is in the relatively low output state, the first piston 220 may move to the specific open position and the first valve 200 may be opened. In this case, inflow of the supply air from the tube side to the shell side may be allowed to form flow F3 of air illustrated in FIG. 4B.

In the humidifier for the fuel cell provided as described above, the supply air is not introduced into the shell side from the tube side in the humidifier when the fuel cell stack is in the high output state, the supply air is introduced into the shell side from the tube side in the humidifier when the fuel cell stack is in the low output state and the exhaust hydrogen is introduced into the shell side, and therefore the hydrogen concentration in the exhaust gas discharged from the humidifier may be effectively reduced.

According to the exemplary embodiment of the present disclosure, one or more of the following effects may be obtained. First, as the valve may be provided to selectively communicate the first region including the first cap and the second cap, and the second region, where the exhaust gas flows, including the exhaust gas inlet and the exhaust gas outlet, the hydrogen concentration of the exhaust gas discharged to the outside of the vehicle may be reduced when the supply air is supplied from the first region to the second region. Further, as the valve is opened or closed based on the pressure change of the first region and the second region in the humidifier, the above effect may be obtained without a separate power source. The effects of the present disclosure are not limited to the effects mentioned above, and other effects not mentioned may be clearly understood by those skilled in the art from the description of the claims.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A humidifier for a fuel cell, comprising:
a membrane module that accommodates a humidifying membrane;
a first cap coupled to a first side of the membrane module and configured to supply a supply air to the humidifying membrane;
a second cap coupled to a second side of the membrane module opposite to the first side of the membrane module and configured to discharge a humidified supply air introduced from the humidifying membrane to a cathode of a fuel cell stack;
an exhaust gas inlet coupled to the membrane module and providing an exhaust gas discharged from the fuel cell stack;
an exhaust gas outlet coupled to the membrane module and discharging a dehumidified exhaust gas, which passes through the membrane module, to an exhaust system; and
a first valve that provides selectively communication between a first region, where the supply air flows, including the first cap and the second cap and a second region, where the exhaust gas flows, including the exhaust gas inlet and the exhaust gas outlet,
wherein the first valve includes:
a first cylinder having a first connection aperture into which the supply air from the first region is introduced, a second connection aperture into which the exhaust gas from the second region is introduced, and a valve opening/closing aperture; and
a first piston movably installed inside the cylinder to open and close the valve opening/closing aperture,
wherein a force applied to a first side of the piston by the supply air and a force applied to a second side of the piston by the exhaust gas allow the piston to move inside the cylinder.

2. The humidifier for the fuel cell of claim 1, wherein the first valve is opened by an internal pressure of the second region when the exhaust gas discharged from the cathode and an exhaust hydrogen discharged from an anode of the fuel cell stack are introduced into the second region, the supply air is introduced from the first region to the second region upon opening the first valve, the exhaust air in the second region is mixed with exhaust hydrogen, and a hydrogen concentration of the mixed gas discharged through the exhaust gas outlet is reduced.

3. The humidifier for the fuel cell of claim 1, wherein the first valve is installed between the first cap and the exhaust gas outlet.

4. The humidifier for the fuel cell of claim 1, wherein the first cylinder extends in a longitudinal direction, the first connection aperture and the second connection aperture are formed in a first side and a second side of the first cylinder respectively with respect to the longitudinal direction of the first cylinder and are formed facing each other, and the valve opening/closing aperture is formed in a direction perpendicular to the longitudinal direction of the first cylinder.

5. The humidifier for the fuel cell of claim 4, wherein the first piston has a specific length greater than a length of the valve opening/closing aperture with respect to the longitudinal direction of the first cylinder to close the valve opening/closing aperture when the first piston is disposed at a specific close position.

6. The humidifier for the fuel cell of claim 4, wherein the first piston has a length less than a length between a first end of the first cylinder where the first connection aperture is formed and a farthest part of the valve opening/closing aperture from the first end of the first cylinder with respect to the longitudinal direction of the first cylinder to at least partially open the valve opening/closing aperture when the first piston is disposed at a specific open position.

7. The humidifier for the fuel cell of claim 1, wherein the first valve includes an elastic member disposed inside the first cylinder to elastically support the piston.

8. The humidifier for the fuel cell of claim 7, wherein the elastic member elastically supports the first piston in a direction where the first piston is pressed by the exhaust gas introduced into the first cylinder.

9. The humidifier for the fuel cell of claim 1, further comprising:
a second valve provided to open and close a flow path where an exhaust hydrogen is introduced from an anode of the fuel cell stack to the second region of the humidifier,
wherein the second valve is opened and closed by a pressure of the exhaust hydrogen discharged from the fuel cell stack.

10. The humidifier for the fuel cell of claim 9, wherein the second valve includes:
a second cylinder including a first aperture into which the exhaust hydrogen from the anode is introduced, a second aperture into which the exhaust gas from the second region is introduced, and a hydrogen exhaust aperture; and
a second piston movably installed inside the second cylinder to open and close the hydrogen exhaust aperture,
wherein a force applied to a first side of the second piston by the exhaust hydrogen and a force applied to a second side of the second piston by the exhaust gas allow the second piston to move inside the second cylinder.

11. The humidifier for the fuel cell of claim 10, wherein the first valve includes:
a first cylinder including a first connection aperture into which the supply air form the first region introduced, a second connection aperture connected to an internal space of the second valve, and a valve opening/closing aperture; and
a first piston movably installed inside the first cylinder to open and close the valve opening/closing aperture,
wherein the second cylinder includes a third aperture connected to the second connection aperture,
wherein the second piston allows the exhaust gas to be introduced from the second region into an internal space of the first cylinder through the second valve when the second piston is disposed at a specific open position, and
wherein a force applied to a first side of the first piston by the supply air and a force applied to a second side of the first piston by the exhaust gas allow the first piston to move inside the first cylinder.

12. The humidifier for the fuel cell of claim 11, wherein the second cylinder has a fourth aperture and the second piston has a piston aperture, and the exhaust hydrogen introduced into the first through aperture is discharged to the second region through the hydrogen exhaust aperture when the second piston is disposed at the open position, and the exhaust gas introduced through the fourth aperture is introduced to the internal space of the first cylinder through the third aperture.

13. The humidifier for the fuel cell of claim 10, wherein the second valve includes a second elastic member disposed inside of the second cylinder to elastically support the second piston in a direction where the second piston is pressed by the exhaust gas introduced inside of the second cylinder.

\* \* \* \* \*